(12) United States Patent
Yamashita et al.

(10) Patent No.: US 11,522,191 B2
(45) Date of Patent: Dec. 6, 2022

(54) NONAQUEOUS ELECTROLYTE BATTERY, BATTERY PACK AND VEHICLE (71) Applicant: Kabushiki Kaisha Toshiba, Minato-ku (JP)

(72) Inventors: Yasunobu Yamashita, Meguro (JP); Keigo Hoshina, Yokohama (JP); Yoshiyuki Isozaki, Nerima (JP); Norio Takami, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 72 days.

(21) Appl. No.: 17/020,575

(22) Filed: Sep. 14, 2020

(65) Prior Publication Data

US 2020/0411864 A1 Dec. 31, 2020

Related U.S. Application Data (63) Continuation-in-part of application No. 15/388,542, filed on Dec. 22, 2016, now abandoned.

(30) Foreign Application Priority Data

Mar. 16, 2016 (JP) .................................. 2016-052960

(51) Int. Cl.
*H01M 4/58* (2010.01)
*H01M 10/44* (2006.01)
(Continued)

(52) U.S. Cl.
CPC ....... *H01M 4/5825* (2013.01); *H01M 10/425* (2013.01); *H01M 10/441* (2013.01);
(Continued)

(58) Field of Classification Search
CPC .... H01M 4/5825; H01M 4/131; H01M 4/136; H01M 4/485; H01M 4/623; H01M 4/625;
(Continued)

(56) References Cited

U.S. PATENT DOCUMENTS 8,586,002 B2 11/2013 Lee et al.
8,753,769 B2 6/2014 Morishima
(Continued)

FOREIGN PATENT DOCUMENTS

CN 104428942 A 3/2015
CN 104466175 A 3/2015
(Continued)

OTHER PUBLICATIONS

Chenglin Hu, et al., "Improving the electrochemical activity of $LiMnPO_4$ via Mn-site co-substitution with Fe and Mg", Electrochemistry Communications, Elsevier, XP027539461, vol. 12, No. 12, Oct. 28, 2010, pp. 1784-1787.
(Continued)

*Primary Examiner* — Amanda C. Walke
(74) *Attorney, Agent, or Firm* — Oblon, McClelland, Maier & Neustadt, L.L.P.

(57) ABSTRACT

A nonaqueous electrolyte battery includes: a positive electrode containing a positive electrode active material made of a compound represented by a compositional formula of $LiMn_{1-x-y}Fe_xA_yPO_4$ (wherein A is at least one selected from the group consisting of Mg, Ca, Al, Ti, Zn and Zr, $0 \leq x \leq 0.3$, and $0 \leq y \leq 0.1$); a negative electrode containing a negative electrode active material made from a titanium composite oxide; and a nonaqueous electrolyte, wherein a ratio ($I_{P-F}/I_{P-O}$) of a peak intensity ($I_{P-F}$) of a P—F bond to a peak intensity ($I_{P-O}$) of a P—O bond on the surface of the positive electrode, which are measured by X-ray photoelectron spectroscopic analysis, is 0.4 or more and 0.8 or less.

9 Claims, 4 Drawing Sheets (51) Int. Cl.
*H01M 10/42* (2006.01)
*H01M 50/20* (2021.01)
*H01M 4/02* (2006.01)

(52) U.S. Cl.
CPC ...... *H01M 50/20* (2021.01); *H01M 2004/028* (2013.01); *H01M 2220/20* (2013.01)

(58) Field of Classification Search
CPC ............. H01M 4/661; H01M 10/0525; H01M 10/0568; H01M 10/0569; H01M 10/4257; H01M 50/411
See application file for complete search history.

(56) References Cited

U.S. PATENT DOCUMENTS

| | | |
|---|---|---|
| 2007/0166617 A1 | 7/2007 | Gozdz et al. |
| 2008/0241692 A1 | 10/2008 | Saruwatari et al. |
| 2010/0248038 A1 | 9/2010 | Takami et al. |
| 2011/0250497 A1 | 10/2011 | Gaubicher et al. |
| 2011/0274975 A1 | 11/2011 | Kashiwa et al. |
| 2013/0071753 A1 | 3/2013 | Kim et al. |
| 2013/0140496 A1 | 6/2013 | Nuspl et al. |
| 2014/0106225 A1 | 4/2014 | Matsuno et al. |
| 2014/0272551 A1 | 9/2014 | Saruwatari et al. |
| 2014/0356720 A1 | 12/2014 | Nuspl et al. |
| 2014/0377640 A1 | 12/2014 | Takenouchi et al. |
| 2015/0037620 A1 | 2/2015 | Nishi et al. |
| 2015/0050562 A1 | 2/2015 | Abe et al. |
| 2015/0270544 A1 | 9/2015 | Yoshida et al. |
| 2015/0303474 A1 | 10/2015 | Barker et al. |
| 2016/0259011 A1 | 9/2016 | Joe |
| 2017/0133684 A1 | 5/2017 | Han et al. |
| 2018/0097230 A1* | 4/2018 | Oyama ................. H01M 4/136 |
| 2020/0020987 A1 | 1/2020 | Morisawa et al. |
| 2020/0091513 A1* | 3/2020 | Harada ............. H01M 10/0525 |

FOREIGN PATENT DOCUMENTS

| | | |
|---|---|---|
| EP | 2 784 854 A1 | 10/2014 |
| JP | 2010-118179 A | 5/2010 |
| JP | 10-2010-0136805 A | 12/2010 |
| JP | 2013-4284 A | 1/2013 |
| JP | 2013-69566 A | 4/2013 |
| JP | 2013-152825 A | 8/2013 |
| JP | 2015-46382 A | 3/2015 |
| KR | 10-2010-0136805 A | 12/2010 |
| WO | WO 2015/045254 A1 | 4/2015 |

OTHER PUBLICATIONS

Jianguo Duan, et al., "Synthesis of high-performance Fe—Mg-co-doped LiMnPO$_4$/C via a mechano-chemical liquid-phase activation technique", Ionics, XP035942732, vol. 22, No. 5, 2016, pp. 609-619.

* cited by examiner

NONAQUEOUS ELECTROLYTE BATTERY, BATTERY PACK AND VEHICLE

CROSS-REFERENCE TO RELATED APPLICATION

This application is a continuation-in-part application of U.S. application Ser. No. 15/388,542, filed Dec. 22, 2016, based upon and claims the benefit of priority from Japanese Patent Application No. 2016-052960, filed Mar. 16, 2016, the entire contents of which are incorporated herein by reference.

FIELD

Embodiments described herein relate generally to a nonaqueous electrolyte battery, battery pack including the same and a vehicle.

BACKGROUND

The active development has been carried out on a nonaqueous electrolyte battery, in which charge/discharge is carried out through the movement of lithium ions between a negative electrode and a positive electrode, as a high-energy density battery.

This type of nonaqueous electrolyte battery has been used as an electric power source for a small electronic device, and is also expected to be used as a medium-size or large-size power source for an in-vehicle application or a stationary application.

Examples of the nonaqueous electrolyte battery having excellent battery life performance and high safety includes a nonaqueous electrolyte battery using spinel type lithium titanate in a negative electrode.

In a nonaqueous electrolyte battery including a lithium manganese phosphate-containing positive electrode and a titanium oxide-containing negative electrode, large capacity deterioration is caused by a deviation in the state of charge (SOC) of the battery, and side reactions are easily caused by functional groups and adsorbed water existing on the surface of the titanium oxide.

It is known that, in a nonaqueous electrolyte battery, a life of a lithium manganese phosphate-containing positive electrode is improved by the coating component formed by the decomposition of a carbonate-based electrolyte solvent.

However, the coating component formed by the decomposition of a carbonate-based electrolytic solution solvent has low stability to an organic solvent, and the coating component sometimes dissolves in an electrolytic solution under the high-temperature condition or through the repetition of charge/discharge.

It is also known that side reactions are suppressed by increasing a phosphorus concentration in the vicinity of a surface of a lithium iron phosphate-containing positive electrode.

However, in this method, it is necessary to wash the surface of a positive electrode with an acid and to refire the positive electrode.

DETAILED DESCRIPTION

Hereinafter, the embodiments of a nonaqueous electrolyte battery, battery pack including the same and a vehicle are described with reference to the Drawings.

First Embodiment

The present invention provides a nonaqueous electrolyte battery including a positive electrode, a negative electrode and a nonaqueous electrolyte.

In more details, the nonaqueous electrolyte battery of the present invention includes a positive electrode containing a positive electrode active material made of a compound represented by a compositional formula of $LiMn_{1-x-y}Fe_xA_yPO_4$ (wherein A is at least one selected from the group consisting of Mg, Ca, Al, Ti, Zn and Zr, $0 \leq x \leq 0.3$, and $0 \leq y \leq 0.1$); a negative electrode containing a negative electrode active material made from a titanium composite oxide; and a nonaqueous electrolyte, wherein a ratio ($I_{P-F}/I_{P-O}$) of a peak intensity ($I_{P-F}$) of a P—F bond to a peak intensity ($I_{P-O}$) of a P—O bond on the surface of the positive electrode, which are measured by X-ray photoelectron spectroscopic analysis, is 0.4 or more and 0.8 or less.

(Positive Electrode)

The positive electrode includes a positive electrode current collector and a positive electrode mixture layer formed on one side or both sides of the positive electrode current collector. The positive electrode mixture layer contains a positive electrode active material-containing positive electrode material, an electroconductive agent and a binder. An electroconductive agent and a binder are optional components.

The positive electrode material contains a positive electrode active material made of a compound represented by a compositional formula of $LiMn_{1-x-y}Fe_xA_yPO_4$ (wherein A is at least one selected from the group consisting of Mg, Ca, Al, Ti, Zn and Zr, $0 \leq x \leq 0.3$, and $0 \leq y \leq 0.1$), and a carbonaceous material (lithium-absorbing substance) covering the surface of the positive electrode active material. The element A can be used singly or in combination of the plural kinds of elements.

Specific examples of the compound represented by the compositional formula of $LiMn_{1-x-y}Fe_xA_yPO_4$ include $LiMn_{0.85}Mg_{0.05}Fe_{0.1}PO_4$.

The carbonaceous material is obtained by firing a carbon source such as carboxymethylcellulose. The carbonaceous material forms a coating film covering at least a part of the surface of the positive electrode active material.

Examples of the electroconductive agent include a carbonaceous material such as acetylene black, carbon black, graphite, carbon nanofiber, or carbon nanotube. These carbonaceous materials can be used singly or in combination of 2 or more.

The binder binds the positive electrode material, the electroconductive agent and the current collector. Examples of the binder include polytetrafluoroethylene (PTFE), polyvinylidene fluoride (PVdF), a fluorine-based rubber, an acrylic resin, and cellulose such as carboxymethyl cellulose.

The total of the contents of the positive electrode active material and the carbonaceous material is preferably 80 mass % or more and 95 mass % or less, the content of the electroconductive agent is preferably 3 mass % or more and 18 mass % or less, and the content of the binding agent is 2 mass % or more and 17 mass % or less.

By setting the content of the electroconductive agent to 3 mass % or more, it is possible to exert the effect of ensuring the electroconductivity of the positive electrode. Also, by setting the content of the electroconductive agent to 18 mass % or less, it is possible to reduce the decomposition of the nonaqueous electrolyte on the surface of the electroconductive agent in high-temperature preservation.

By setting the content of the binder to 2 mass % or more, it is possible to obtain sufficient electrode intensity. By setting the content of the binder to 17 mass % or less, it is possible to reduce the blending amount of the binder, which is an insulating material in the positive electrode mixture layer, and to reduce the internal resistance of the positive electrode.

Preferable examples of the positive electrode current collector include an aluminum foil and an aluminum alloy foil containing at least one element selected from the group consisting of Mg, Ti, Zn, Mn, Fe, Cu, and Si.

The positive electrode in the present embodiment has a ratio ($I_{P-F}/I_{P-O}$) of a peak intensity ($I_{P-F}$) of a P—F bond to a peak intensity ($I_{P-O}$) of a P—O bond on the surface of the positive electrode, which are measured by X-ray photoelectron spectroscopic analysis, is 0.4 or more and 0.8 or less.

The peak of the P—O bond is attributed mainly to the $PO_4$ unit of $LiMn_{1-x-y}Fe_xA_yPO_4$ which is the positive electrode active material, and appears at around 133.5 eV.

On the other hand, the peak of the P—F bond is attributed to a decomposition product of a lithium salt, such as $LiPF_6$ or $LiBF_4$, contained in the nonaqueous electrolyte and appears at around 135.2 eV.

In this positive electrode, the protective coating derived from the decomposition product of the lithium salt is formed on the surface of the positive electrode, and thus, it is possible to expect the effects of suppressing side reactions and improving battery life performance in the cell having lithium manganese phosphate as the positive electrode and titanium composite oxide as the negative electrode.

When $I_{P-F}/I_{P-O}$ is less than 0.4, the stable protective coating is not sufficiently formed on the surface of the positive electrode, so the exposure of the surface of the positive electrode active material (positive electrode material) becomes large. As a result, side reactions on the surface of the positive electrode active material (positive electrode material), which occur in association with charge/discharge, become problematic. On the other hand, when $I_{P-F}/I_{P-O}$ exceeds 0.8, the protective coating is excessively formed on the surface of the positive electrode. This increases the resistance of the positive electrode.

Further, the peak intensities of the P—O bond and the P—F bond can be obtained by removing the background from the P2p spectrum and fitting the resultant spectrum. The detailed example of the method of obtaining the peak intensities of the P—O bond and the P—F bond is described in Examples.

(Negative Electrode)

The negative electrode includes a negative electrode current collector and a negative mixture layer which is formed on one surface or both surfaces of the negative electrode current collector.

The negative electrode active material is comprised of titanium composite oxide.

The titanium composite oxide comprises at least one selected from the group consisting of a spinel type lithium titanate $Li_4Ti_5O_{12}$, a monoclinic β type titanium composite oxide $TiO_2$, $Ti_{1-x}M1_xNb_{2-y}M2_yO_{7-\delta}$ (wherein M1 and M2 are at least one selected from the group consisting of Mg, Fe, Ni, Co, W, Ta and Mo, M1 and M2 may be the same or different, $0 \le x \le 1$, and $0 \le y \le 1$), and $Li_2Na_{2-x}M1_xTi_6O_{14}$ (wherein M1 is at least one selected from the group consisting of Nb, W, Ta and Mo, and $0 \le x \le 1$). These negative electrode active materials may be used singly or in combination of the plural kinds.

Examples of the titanium composite oxide include a spinel-structured lithium titanate, a monoclinic β type titanium composite oxide, an anatase type titanium composite oxide, a ramsdelide type lithium titanate, and titanium-containing oxides such as $TiNb_2O_7$ and $Ti_2Nb_2O_9$. Among them, a spinel-structured lithium titanate is preferable in terms of excellent cycle characteristics and rate characteristics.

As the negative electrode active material, a niobium composite oxide may be contained. Examples of the niobium composite oxide include $Nb_2O_5$, $Nb_{12}O_{29}$ and the like.

As the conductive agent and the binder, the same materials as in the positive electrode are used.

The content of the negative electrode active material in the negative electrode mixture layer is preferably 70 mass % or more and % mass % or less, the content of the electroconductive agent is preferably 2 mass % or more and 28 mass % or less, and the content of the binder is 2 mass % or more and 28 mass % or less.

When the content of the electroconductive agent is less than 2 mass %, the current collection performance of the negative electrode mixture layer can deteriorate, and the large current characteristics of the nonaqueous electrolyte battery can deteriorate.

When the content of the binder is less than 2 mass %, the binding property between the negative electrode mixture layer and the negative electrode current collector can deteriorate, and the cycle characteristics can deteriorate.

Also, it is preferable to set the content of the electroconductive agent and the binder to 28 mass % or less in terms of the achievement of high capacity.

Preferable examples of the negative electrode current collector include an aluminum foil, which is electrochemically stable within a potential range of nobler than 1.0 V, and an aluminum alloy foil containing at least one element selected from the group consisting of Mg, Ti, Zn, Mn, Fe, Cu, and Si.

(Nonaqueous Electrolyte)

Usable examples of the nonaqueous electrolyte include a liquid nonaqueous electrolyte or a gel-like nonaqueous electrolyte. The liquid nonaqueous electrolyte is prepared by dissolving an electrolyte in an organic solvent. A concentration of the electrolyte is preferable 2.0 mol/L ore more and 3.5 mol/L or less.

The gel-like nonaqueous electrolyte is prepared by complexing a liquid electrolyte and a polymer material.

Preferable examples of the electrolyte include lithium salts such as lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonimide [$LiN(CF_3SO_2)$]. Among these, it is preferable to use lithium hexafluorophosphate or lithium tetrafluoroborate. These electrolytes can be used singly or in combination of 2 or more.

It is preferable that the nonaqueous electrolyte preferably contain at least one of lithium hexafluorophosphate and bistrifluoromethylsulfonylimitritium at 2 mol/L or more and 3.5 mol/L or less. When the content of at least one of lithium hexafluorophosphate and bistrifluoromethylsulfonylimitritium in the nonaqueous electrolyte is within the above range, it is possible to well enhance the formation of the stable protective coating on the surface of the positive electrode.

It is more preferable that the nonaqueous electrolyte contain, as an additive, $LiP_xO_yF_z$ which is the decomposition product of lithium hexafluorophosphate at a concentration of 0.1 mass % or more and 3.0 mass % or less. When the content of $LiP_xO_yF_z$ in the nonaqueous electrolyte is within the above range, it is possible to well enhance the formation of the stable protective coating on the surface of the positive electrode.

Examples of the organic solvent include cyclic carbonates such as propylene carbonate (PC), ethylene carbonate (EC), and vinylene carbonate: chain carbonates such as diethyl carbonate (DEC), dimethyl carbonate (DMC), and methylethyl carbonate (MEC); cyclic ethers such as tetrahydrofuran (THF), 2-methyltetrahydrofuran (2MeTHF), and dioxolane (DOX); chain ethers such as dimethoxyethane (DME) and diethoethane (DEE); γ-butyrolactone (GBL); α-methyl-γ-butyrolactone (MBL); acetonitrile (AN), and sulfolane (SL). These organic solvents can be used singly or in combination of 2 or more.

More preferable examples of the organic solvent include mixed solvents obtained by mixing at least two solvents selected from the group consisting of propylene carbonate (PC), ethylene carbonate (EC), diethyl carbonate (DEC), dimethyl carbonate (DMC) and methyl ethyl carbonate (MEC), and a mixed solvent containing γ-butyrolactone (GBL). By using these mixed solvents, it is possible to obtain a nonaqueous electrolyte battery having excellent low-temperature characteristics.

Examples of the polymer material include polyvinylidene fluoride (PVdF), polyacrylonitrile (PAN), and polyethylene oxide (PEO).

Next, a method for manufacturing the positive electrode and the negative electrode constituting the nonaqueous electrolyte battery of the present embodiment will be described.

(Production Method of Positive Electrode Material)

A method for producing the positive electrode material will be described.

In the method for producing the positive electrode material in the present embodiment, the positive electrode active material made of the compound represented by the compositional formula of $LiMn_{1-x-y}Fe_xA_yPO_4$ and the carbonaceous material covering the surface of the positive electrode active material are simultaneously produced.

A hydrothermal synthesis method is preferable as a method for producing $LiMn_{1-x-y}Fe_xA_yPO_4$.

In a solid phase method which is a general method of synthesizing ceramics, there are the concerns about that the particle size of $LiMn_{1-x-y}Fe_xA_yPO_4$ is increased, and impurities are easily generated. On the other hand, in the hydrothermal synthesis method, it is easy to dope Mg and to obtain $LiMn_{1-x-y}Fe_xA_yPO_4$ which is a fine particle and has high crystallinity. Therefore, even when dissolving Mn and Fe in the vicinity of the surface of the obtained $LiMn_{1-x-y}Fe_xA_yPO_4$ particles, it is possible to minimize the deterioration of the electrode performance.

Hereinafter, an example of the hydrothermal synthesis method of $LiMn_{1-x-y}Fe_xA_yPO_4$ will be described.

Lithium sulfate ($Li_2SO_4$), manganese sulfate pentahydrate ($MnSO_4 \cdot 5H_2O$), magnesium sulfate heptahydrate ($MgSO_4 \cdot 7H_2O$), iron sulfate heptahydrate ($FeSO_4 \cdot 7H_2O$), diammonium hydrogen phosphate (($NH_4$)$_2HPO_4$), and sodium carboxymethyl cellulose are dissolved in pure water in a nitrogen atmosphere. At this time, the molar ratio of the dissolved metals is set to the following ratio: Li:Mn:Mg:Fe=3:0.85:0.05:0.1.

The solution, in which the above starting materials are dissolved, is put in a pressure-resistant container, sealed, and subjected to a heat treatment at 200° C. for 3 hours while stirring, for example. After the heat treatment, a sample is extracted by centrifugation, and recovered by freeze-drying to prevent aggregation of sample powders.

The recovered sample is crushed in ethanol by using a planetary ball mill apparatus, and then subjected to a heat treatment at, for example, 700° C. for 1 hour under an argon atmosphere, to obtain $LiMn_{0.85}Mg_{0.05}Fe_{0.1}PO_4$. In $LiMn_{0.85}Mg_{0.05}Fe_{0.1}PO_4$, a film, which is made of the carbonaceous material containing 2 mass % carbon by using carboxymethyl cellulose as a carbon source, is formed on the particle surface.

(Production Method of Positive Electrode)

The positive electrode can be produced, for example, by the following method.

First, the conductive agent, the binder and the positive electrode material containing the positive electrode active material made of the compound represented by the compositional formula of $LiMn_{1-x-y}Fe_xA_yPO_4$ are suspended in a solvent to thereby prepare a slurry.

Next, this slurry is applied to one side or both sides of the positive electrode current collector and dried to form a positive electrode mixture layer.

Thereafter, the positive electrode is obtained through pressing.

Further, the positive electrode mixture containing the positive electrode material, the conductive agent, and the binder can be molded into a pellet shape and used as the positive electrode mixture layer.

(Production Method of Negative Electrode)

The negative electrode can be produced, for example, by the following method.

First, the negative electrode active material, the conductive agent, and the binder are suspended in a solvent to thereby prepare a slurry.

Next, this slurry is applied to one side or both sides of the negative electrode current collector and dried to form a negative electrode mixture layer.

Thereafter, the negative electrode is obtained through pressing.

Further, the negative electrode mixture containing the negative electrode material, the conductive agent, and the binder can be molded into a pellet shape and used as the negative electrode mixture layer.

(Method for Forming Protective Coating onto Surface of Positive Electrode)

Examples of the method for forming the protective coating derived from the decomposition product of the lithium salt include the method in which a nonaqueous electrolyte battery is produced by using a nonaqueous electrolyte having a predetermined composition, and is heat-treated before using the nonaqueous electrolyte battery.

First, the lithium salt containing fluorine at 2 mol/L or more and 3.5 mol/L or less is prepared. Examples of the fluorine-containing lithium salt include lithium hexafluorophosphate ($LiPF_6$), lithium tetrafluoroborate ($LiBF_4$), lithium arsenic hexafluoride ($LiAsF_6$), lithium trifluoromethasulfonate (LiCF$_3$SO$_3$), bistrifluoromethylsulfonylimitritium [LiN(CF$_3$SO$_2$)$_2$].

It is preferable that the nonaqueous electrolyte contain LiPxOyFz, which is a decomposition product of lithium hexafluorophosphate, at a concentration of 0.1 mass % or more and 3.0 mass % or less as an additive.

Next, the nonaqueous electrolyte battery including the nonaqueous electrolyte, the above-described positive electrode and negative electrode is produced.

Next, before using the nonaqueous electrolyte battery, the battery is subjected to a heat treatment at 65° C. or more and 85° C. or less for 24 hours or more at a charging depth of 5% or more and 80% or less, to thereby form the protective coating derived from the decomposition product of the lithium salt on the surface of the positive electrode.

When the heat treatment temperature is set to 65° C. or more, the protective coating is sufficiently formed on the surface of the positive electrode. When the heat treatment temperature is set to 85° C. or less, it is possible to prevent the deterioration of the positive electrode active material and the negative electrode active material.

When the depth of charge is set to 5% or more, the protective coating is sufficiently formed on the surface of the positive electrode. When the charging depth is set to 80% or less, it is possible to prevent the deterioration of the positive electrode and the negative electrode.

According to the nonaqueous electrolyte battery of the present embodiment, the protective coating derived from the decomposition product of the lithium salt is formed on the surface of the positive electrode, and thus, it is possible to suppress side reactions on the surface of the positive electrode and to improve battery life performance in the nonaqueous electrolyte battery having lithium manganese phosphate as the positive electrode and titanium composite oxide as the negative electrode.

Second Embodiment

The 2nd Embodiment provides the nonaqueous electrolyte battery including the positive electrode, the negative electrode and the nonaqueous electrolyte which are described in the 1st embodiment. Also, the nonaqueous electrolyte battery according to the present embodiment includes the separator and the external member.

More specifically, the nonaqueous electrolyte battery according to the present embodiment includes the external member; the positive electrode housed in the external member; the negative electrode which is spatially separated from the positive electrode and is housed in the external member with the separator interposed therebetween; and the nonaqueous electrolyte with which the inside of the external member is filled.

Figure 1:
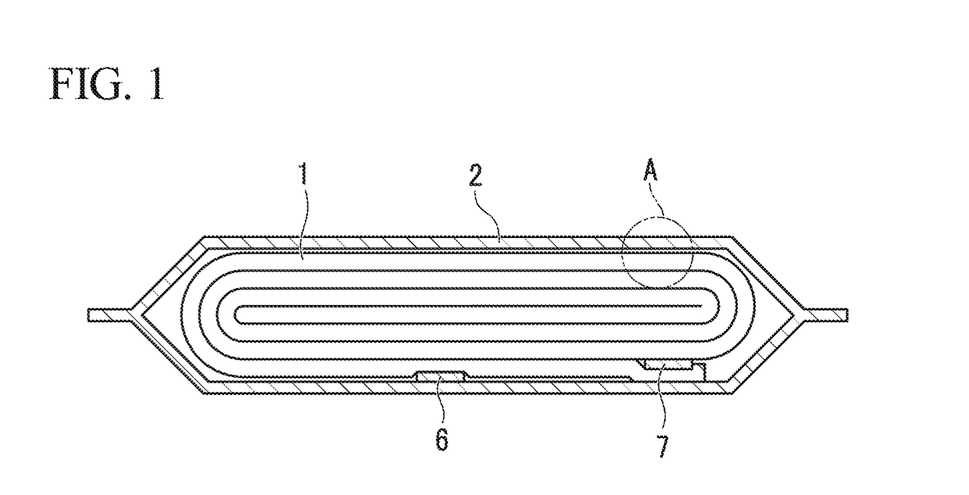
FIG. 1 is a schematic view illustrating the nonaqueous electrolyte battery according to the 2nd embodiment.
Figure 2:
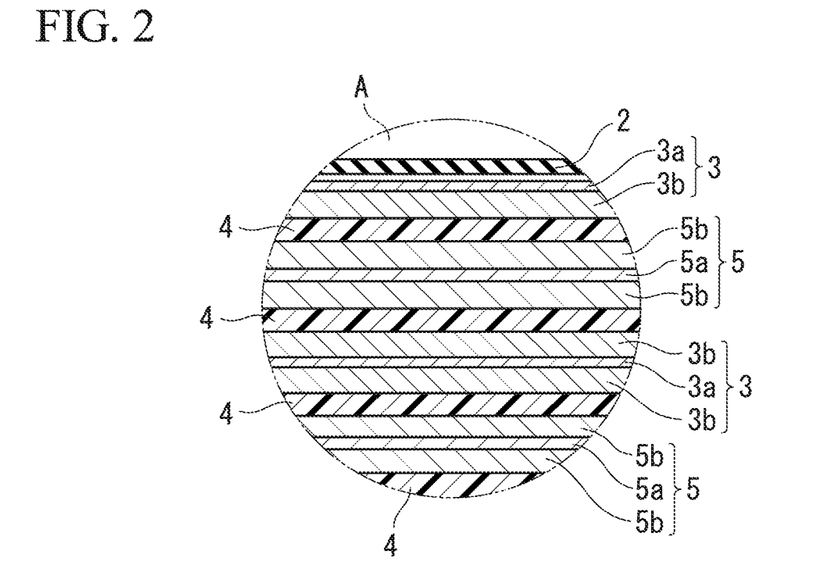
FIG. 2 is a schematic view illustrating the nonaqueous electrolyte battery according to the 2nd embodiment.

Hereinafter, the thin type nonaqueous electrolyte battery (nonaqueous electrolyte battery) 10 illustrated in FIG. 1 and FIG. 2 is described as an example of the nonaqueous electrolyte battery according to the present embodiment. FIG. 1 is a schematic cross-sectional view illustrating the thin type nonaqueous electrolyte battery 10. FIG. 2 is an enlarged cross-sectional view of the part A illustrated in FIG. 1. These drawings are schematic diagrams for describing the nonaqueous electrolyte battery according to the embodiment. The shapes, dimensions, ratios, and the like are different from those of actual device at some parts, but design of the shape, dimensions, ratios, and the like can be appropriately modified in consideration of the following description and known technologies.

The nonaqueous electrolyte battery 10 illustrated in FIG. 1 is configured such that the winding electrode group 1 with a flat shape is housed in the exterior member 2. The exterior member 2 may be a container obtained by forming a laminate film in a bag-like shape or may be a metal container. Also, as shown in FIG. 2, the winding electrode group 1 with the flat shape is formed by spirally winding the stacked product obtained by stacking the negative electrode 3, the separator 4, the positive electrode 5 and the separator 4 from the outside, i.e. the side of the exterior member 2, in this order, followed by performing press-molding. As illustrated in FIG. 2, the negative electrode 3 located at the outermost periphery has the configuration in which the negative electrode layer 3b is formed on one surface of the negative electrode current collector 3a on the inner surface side. The negative electrodes 3 at the parts other than the outermost periphery have the configuration in which the negative electrode layers 3b are formed on both surfaces of the negative current collector 3a. Also, the positive electrode 5 has the configuration in which the positive electrode layers 5b are formed on both surfaces of the positive current collector 5a. Herein, the gel-like nonaqueous electrolyte described above can be used instead of the separator 4.

In the vicinity of the outer peripheral end of the winding electrode group 1 illustrated in FIG. 1, the negative electrode terminal 6 is electrically connected to the negative current collector 3a of the negative electrode 3 of the outermost periphery. The positive electrode terminal 7 is electrically connected to the positive current collector 5a of the inner positive electrode 5. The negative electrode terminal 6 and the positive electrode terminal 7 extend toward the outside of the exterior member 2, and are connected to the extraction electrodes included in the exterior member 2.

When manufacturing the nonaqueous electrolyte battery 10 including the exterior member formed of the laminate film, the winding electrode group 1 to which the negative electrode terminal 6 and the positive electrode terminal 7 are connected is charged in the bag-shaped exterior member 1 having an opening. Subsequently, the liquid nonaqueous electrolyte is injected from the opening of the exterior member 2. Then, the opening of the bag-shaped exterior member 2 is subjected to heat-sealing in the state of sandwiching the negative electrode terminal 6 and the positive electrode terminal 7 therebetween. Through this process, the winding electrode group 1 and the liquid nonaqueous electrolyte are completely sealed.

Also, when manufacturing the nonaqueous electrolyte battery 10 having the exterior member formed of the metal container, the winding electrode group 1 to which the negative electrode terminal 6 and the positive electrode terminal 7 are connected is charged in the metal container having an opening. Subsequently, the liquid nonaqueous electrolyte is injected from the opening of the exterior member 2. Then, the opening is sealed by mounting a cover member on the metal container.

As the negative electrode 3, the aforementioned negative electrode according to the 1st embodiment is used.

As the positive electrode 5, the aforementioned negative electrode according to the 1st embodiment is used.

As the electrolyte, the aforementioned electrolyte according to the 1st embodiment is used.

As the exterior member 2, a metal container or a bag-shaped exterior container made of a laminated film is used.

Examples of the shape of the exterior member 2 include a flat type, a square type, a cylindrical type, a coin type, a button type, a sheet type and a stacked type. Herein, the shape of the exterior member 2 may be the same as the shape of a large-size battery mounted on a two-wheeled or four-wheeled vehicle, etc. as well as the shape of a small-size battery mounted on a portable electronic device, etc.

As a laminated film, it is possible to use a multi-layer film in which a metal layer is interposed between resin films.

As a material forming a metal layer, for example, an aluminum foil or an aluminum alloy foil is preferable in terms of weight reduction.

As a material forming a resin film, it is possible to use, for example, a polymer compounds such as polypropylene (PP), polyethylene (PE), nylon or polyethylene terephthalate (PET).

A laminate film can be molded by heat-sealing into the shape of the exterior member. The thickness of a laminate film is preferably 0.2 mm or less.

As a metal container, it is possible to use, for example, a container formed of aluminum or an aluminum alloy.

It is preferable that an aluminum alloy contain an element such as magnesium, zinc or silicon. In the aluminum alloy, the content of the transition metal such as iron, copper, nickel or chromium is preferably 100 ppm or less. By setting the content to this range, it is possible to greatly improve long-term reliability under a high-temperature environment and heat radiation property. The thickness of a metal container is preferably 0.5 mm or less, and more preferably 0.2 mm or less.

As the separator 4, it is possible to use, for example, a porous film formed of a material such as polyethylene, polypropylene, cellulose or polyvinylidene fluoride (PVdF); or a nonwoven fabric formed of a synthetic resin. Among these, a porous film formed of polyethylene or polypropylene can melt at a certain temperature and block a current, and thus is preferable in terms of improvement of safety.

As the negative electrode terminal 6, it is possible to use, for example, a terminal formed of the material having electric stability and electroconductivity within a range of 3.0 V or more and 4.5 V or less of a potential equal with respect to lithium. Specific examples of the material for the negative electrode terminal 6 include aluminum and an aluminum alloy containing an element such as Mg, Ti, Zn, Mn, Fe, Cu or Si. Also, it is more preferable that the negative electrode terminal 6 be formed of the same material as the negative current collector 3a in order to reduce the contact resistance with the negative current collector 3a.

As the positive electrode terminal 7, it is possible to use, for example, a terminal formed of the material having electric stability and electroconductivity within a range of 1.0 V or more and 3.0 V or less of a potential with respect to lithium. Specific examples of the material for the positive electrode terminal 7 include aluminum and an aluminum alloy containing an element such as Mg, Ti, Zn, Mn, Fe, Cu or Si. It is more preferable that the positive electrode terminal 7 be formed of the same material as the positive current collector 5a in order to reduce the contact resistance with the positive current collector 5a.

According to the present embodiment described above, it is possible to provide the nonaqueous electrolyte battery.

The nonaqueous electrolyte battery according to the present embodiment includes the negative electrode, the positive electrode, the nonaqueous electrolyte, the separator and the external member. The nonaqueous electrolyte battery according to the present embodiment includes the aforementioned nonaqueous electrolyte battery according to the 1st embodiment. Thus, in the nonaqueous electrolyte battery according to the present embodiment, it is possible to suppress side reactions on the surface of the positive electrode and to improve battery life performance.

Third Embodiment

Next, the battery pack according to the 3rd embodiment is described in detail.

The battery pack according to the present embodiment includes at least one of the nonaqueous electrolyte batteries (i.e. single batteries) of the 2nd embodiment described above as a secondary battery. When the plural single batteries are included in the battery pack, the respective single batteries are arranged so as to be electrically connected in series, in parallel, or in series and parallel.

The battery pack according to the third embodiment may further include a protective circuit. The protective circuit is for controlling a charge/discharge of the nonaqueous electrolyte battery. Alternatively, a circuit, which is included in an apparatus using the battery pack as a power supply (such as an electronic apparatus or an automobile), can be used as the protection circuit of the battery pack.

Also, the battery pack according to the third embodiment may further include an external terminal for energization. The external terminal for energization is for outputting a current from the nonaqueous electrolyte battery to the outside, and for inputting a current to the nonaqueous electrolyte battery. In other words, when using the battery pack as a power supply, a current is supplied to the outside through the external terminal for energization. When charging the battery pack, charging current (including a regenerative energy of a power of an automobile) is supplied to the battery pack through the external terminal for energization.

Figure 3:
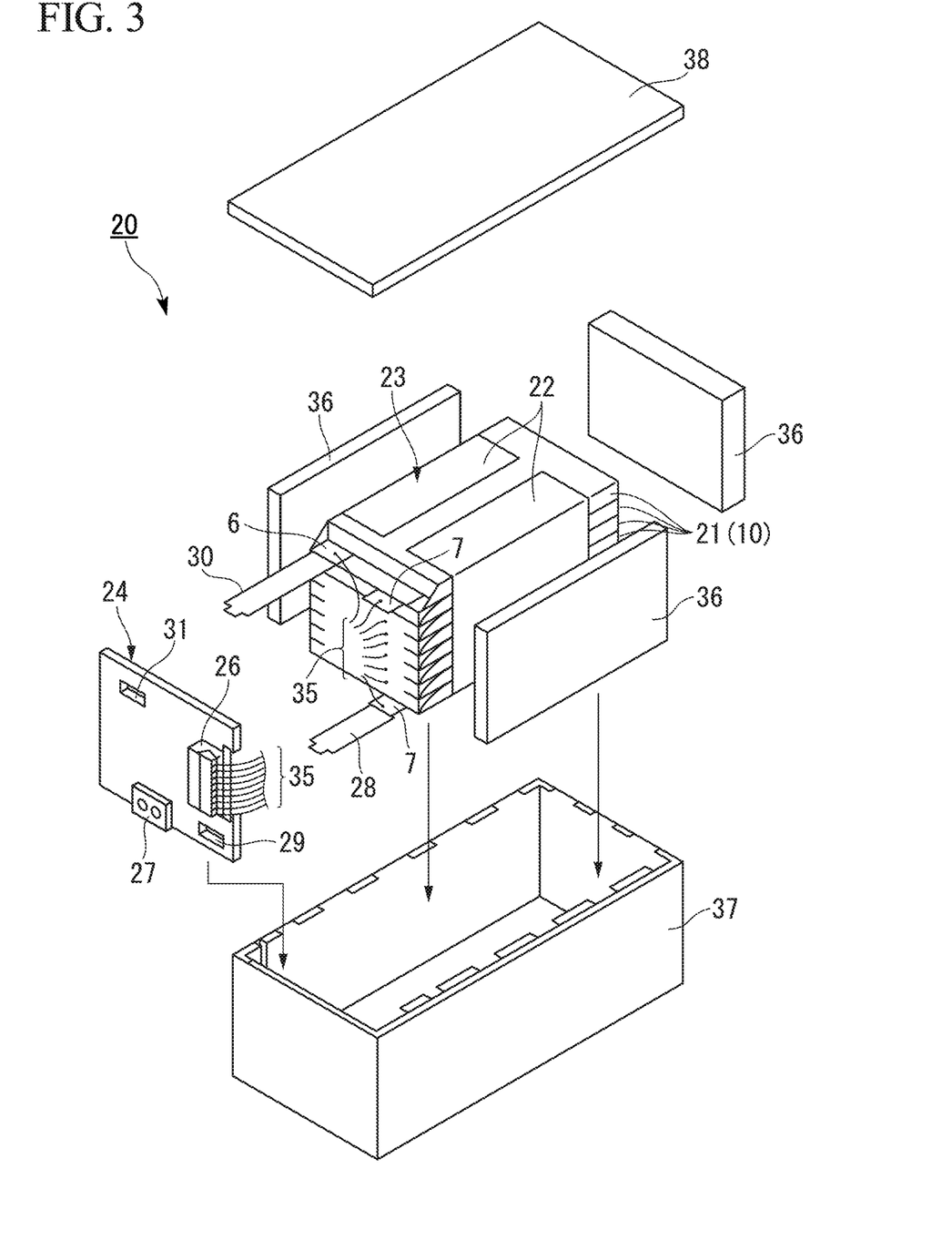
FIG. 3 is a schematic perspective view illustrating the battery pack according to the 3rd embodiment.
Figure 4:
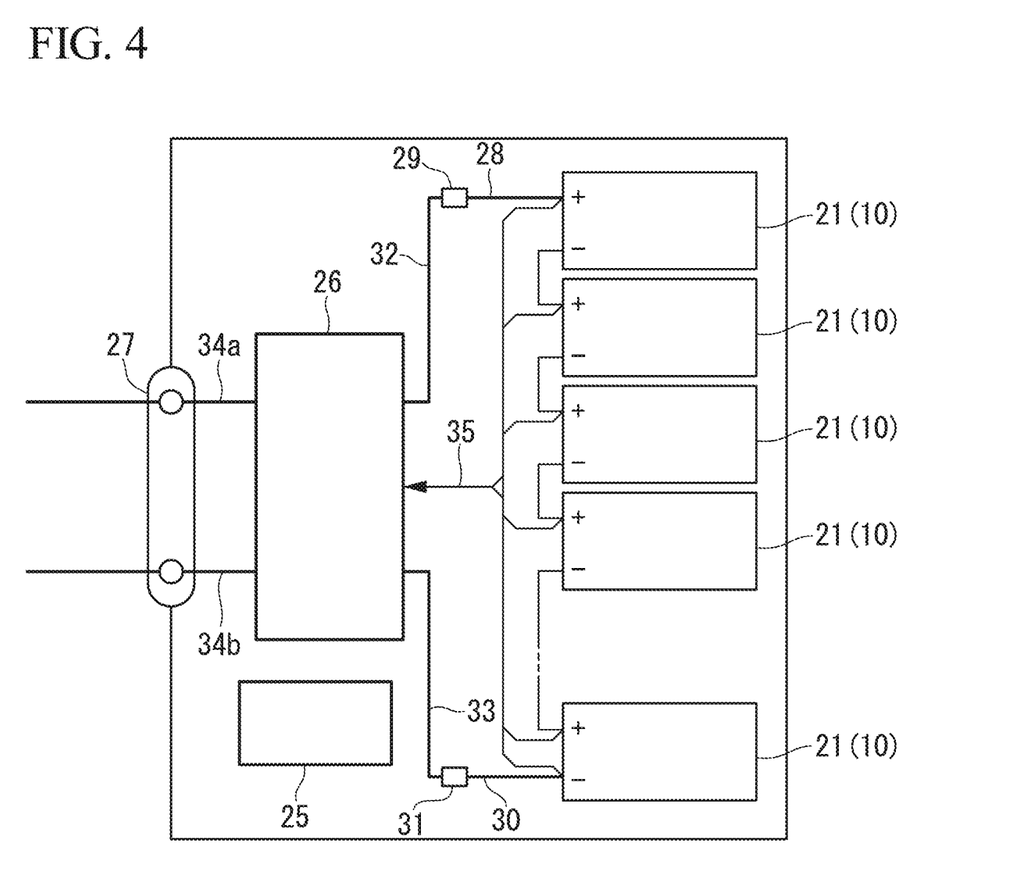
FIG. 4 is a schematic view illustrating the battery pack according to the 3rd embodiment.

Referring to FIG. 3 and FIG. 4, the battery pack 20 according to the present embodiment is described in detail. In the battery pack 20 illustrated in FIG. 3 and FIG. 4, the thin type nonaqueous electrolyte battery 10 illustrated in FIG. 2 is used as the single battery 21.

The plural single batteries 21 are stacked so that the negative electrode terminals 6 and the positive electrode terminals 7 extending to the outside are arranged in the same direction, and thus the assembled batteries 23 are configured by fastening these with the adhesive tape 22. These single batteries 21 are connected mutually and electrically in series, as illustrated in FIG. 3 and FIG. 4.

The printed wiring board 24 is located so as to face the side surfaces of the single batteries 21 from which the negative electrode terminals 6 and the positive electrode terminals 7 extend. As illustrated in FIG. 3, the thermistor 25 (see FIG. 4), the protective circuit 26 and the external terminal (energization terminal) 27 for energizing an external device are mounted on the printed wiring board 24. Herein, an insulation plate (unillustrated) is mounted on the surface of the printed wiring board 24 facing the assembled batteries 23 in order to avoid unnecessary connection with the wires of the assembled batteries 23.

The positive electrode-side lead 28 is connected to the positive electrode terminal 7 located in the lowermost layer of the assembled batteries 23, and the front end of the positive electrode-side lead is inserted into the positive electrode-side connector 29 of the printed wiring board 24 to be electrically connected. The negative electrode-side lead 30 is connected to the negative electrode terminal 6 located in the uppermost layer of the assembled batteries 23, and the front end of the negative electrode-side lead is inserted into the negative electrode-side connector 31 of the printed wiring board 24 to be electrically connected. These positive electrode-side connectors 29 and negative electrode-side connectors 31 are connected to the protective circuit 56 via wires 32, 33 (see FIG. 4) formed in the printed wiring board 24.

The thermistor 25 is used to detect a temperature of the single battery 21. Although not illustrated in FIG. 3, the thermistor is installed near the single batteries 21, and the detection signal thereof is transmitted to the protective circuit 26. The protective circuit 26 controls the charge/discharge of the single batteries 21 so as to protect these. The protective circuit 26 can block the plus-side wire 34*a* and the minus-side wire 34*b* between the protective circuit 26 and the energization terminal 27 for an external device under a predetermined condition. Here, for example, the predetermined condition means the case where the detection temperature of the thermistor 25 increases to a predetermined temperature or more. In addition, the predetermined condition also means the case of detecting an overcharge, overdischarge, overcurrent, or the like of the single battery 21. The detection of the overcharge or the like is performed for the respective single batteries 21 or the whole single batteries 21. Herein, when the overcharge or the like is detected in the respective single batteries 21, a battery voltage may be detected, or a positive electrode potential or a negative electrode potential may be detected. In the latter case, a lithium electrode, which is used as a reference electrode, is inserted into the respective single batteries 21. In the case of FIG. 3 and FIG. 4, the wires 35 for voltage detection are connected to the respective single batteries 21, and detection signals are transmitted to the protective circuit 26 via the wires 35. This protective circuit 26 may be provided on an external device.

As illustrated in FIG. 3, the protective sheets 36 formed of rubber or a resin are respectively placed on three side surfaces of the assembled batteries 23 other than the side surface from which the positive electrode terminals 7 and the negative electrode terminals 6 protrude.

The assembled batteries 23 are housed together with the respective protective sheets 36 and the printed wiring board 24 in the housing container 37. In other words, the protective sheets 36 are placed on both inner surfaces of the housing container 37 in the longer side direction and the inner surface of the housing container in the shorter side direction, and the printed wiring board 24 is placed on the inner surface opposite to the protective sheet 26 in the shorter side direction. The assembled batteries 23 are located in the space surrounded by the protective sheets 26 and the printed wiring board 24. The cover 38 is mounted on the upper surface of the housing container 37.

To fix the assembled batteries 23, a thermal shrinkage tape may be used instead of the adhesive tape 22. In this case, protective sheets are placed on both side surfaces of the assembled batteries, the thermal shrinkage tape is circled, and then the thermal shrinkage tape is subjected to thermal shrinkage so that the assembled batteries are fastened.

Herein, FIG. 3 and FIG. 4 illustrate the single batteries 21 connected in series, but in order to increase the battery capacity, the single batteries 21 may be connected in parallel or may be connected in a combination form of series connection and parallel connection. The assembled battery packs can also be further connected in series or in parallel.

According to the present embodiment described above, it is possible to provide the battery pack. The battery pack according to the present embodiment includes at least one of the nonaqueous electrolyte batteries according to the 2nd embodiment described above. This battery pack has long battery life.

Herein, the form of the battery pack can be appropriately modified according to a use application. A use application of the battery pack according to the embodiment is preferably one which is required to show excellent cycle characteristics when a large current is extracted. Specifically, the battery pack can be used as an electric power source for a digital camera; and a vehicle such as a two-wheeled or four-wheeled hybrid electric vehicle, a two-wheeled or four-wheeled electric vehicle, or an assist bicycle. In particular, the battery pack obtained by using the nonaqueous electrolyte batteries having excellent high-temperature characteristics is appropriately mounted on a vehicle. In the vehicle equipped with the battery pack according to the 3rd embodiment, the battery pack recovers a regenerative energy of a power of the vehicle.

EXAMPLES

Hereinafter, the embodiments described above will be described in more details with reference to the Examples.

Example 1

(Production of Laminate Cell)

The positive electrode active material ($LiMn_{0.8}Fe_{0.15}Mg_{0.05}PO_4$) powder 90 mass %, acetylene black 5 mass % and polyvinylidene fluoride (PVdF) 5 mass % were added to N-methyl-2-pyrrolidone (NMP), and these were mixed to prepare a slurry. This slurry was applied to both surfaces of the current collector made of the aluminum foil having a thickness of 15 μm, dried, and pressed to prepare the positive electrode having an electrode density of 2.0 g/cm$^3$.

The negative electrode active material ($LiTi_5O_{12}$) powder 90 mass %, acetylene black 5 mass % and polyvinylidene fluoride (PVdF) 5 mass % were added to N-methyl-2-pyrrolidone (NMP), and these were mixed to prepare a slurry. This slurry was applied to both sides of the current collector made of the aluminum foil having a thickness of 15 μm, dried, and pressed to prepare the negative electrode having an electrode density of 2.0 g/cm$^3$.

The positive electrode, the separator, the negative electrode, and the separator were laminated in this order, and then wound in a spiral shape. As the separator, the polyethylene porous film having a thickness of 25 μm was used.

This spirally-shaped one was heated and pressed at 90° C. to produce the flat electrode group having a width of 30 mm and a thickness of 3.0 mm.

The obtained flat electrode group was housed in the pack made of the laminate film, and was dried in vacuum at 80° C. for 24 hours. As the laminate film, a polypropylene layer, which was formed on both sides of the aluminum foil having a thickness of 40 μm and a total thickness of 0.1 mm, was used.

The liquid nonaqueous electrolyte was injected into the pack made of the laminate film which housed the flat electrode group.

As the liquid nonaqueous electrolyte, the solution, which was prepared by dissolving $LiPF_6$ (3 mol/L) in the mixed solvent prepared by mixing propylene carbonate (PC) and diethyl carbonate (DEC) in a volume ratio of 1:2, was used.

Thereafter, the pack made of the laminate film was completely sealed by heat sealing to produce the nonaqueous electrolyte battery of Example 1 having the structure shown in FIG. 1 and having a width of 35 mm, a thickness of 3.2 mm, and a height of 65 mm.

(Heat Treatment)

When the capacitance obtained at the 0.2 C rate was taken as 100%, the laminate cell whose charge depth adjusted to 20% was held at 80° C. for 48 hours.

(X-Ray Photoelectron Spectroscopy (XPS))

The heat-treated laminate cell was decomposed in an inert atmosphere, and the positive electrode was taken out, washed with dimethyl carbonate, and then dried in vacuum for 30 minutes.

Figure 5:
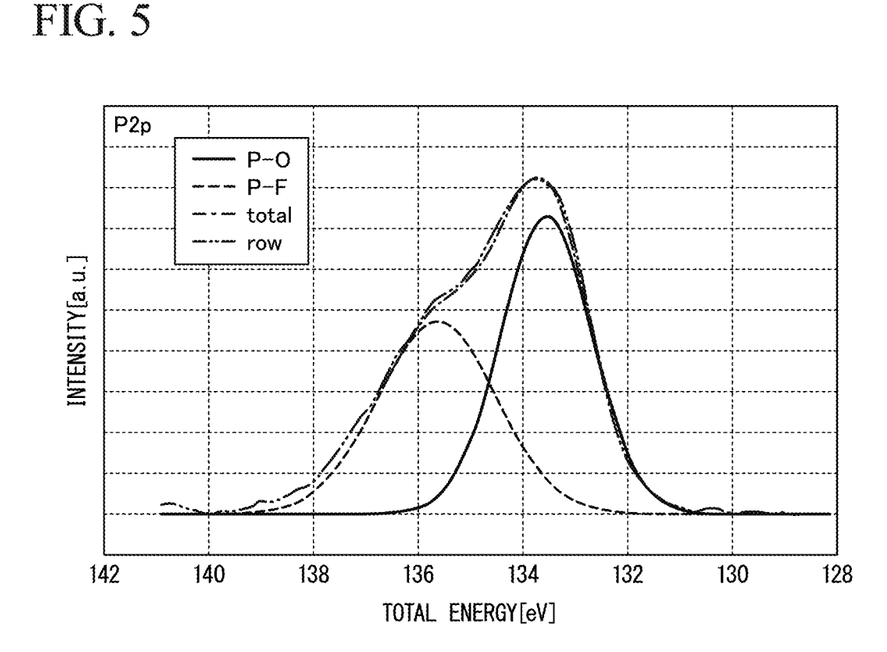
FIG. 5 is a view showing an XPS spectrum of the surface of the positive electrode constituting the nonaqueous electrolyte battery of Example 1.

The X-ray photoelectron spectroscopic analysis (XPS) was carried out on the obtained positive electrode by using the combined electron spectroscopic analyzer (manufactured by PHI, ESCA-5800). The measurement conditions were as follows. The measurement area was φ800 μm, the sputtering rate was 2.9 nm/min, and AlKα radiation was used as a radiation source. FIG. 5 shows the XPS spectrum of the positive electrode surface at this time. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.60. The results are shown in Table 1.

The method of calculating the peak intensity ratio will be described below.

First, the background is subtracted from the obtained P2p spectrum of 126 eV to 142 eV by the Shirley method. Thereafter, the mixed function of the Gaussian function and the Lorentz function was used to fit the spectrum from the sum of the peak of the P—F bond having the maximum value in the vicinity of 135.2 eV and the peak of the P—O bond having the maximum value in the vicinity of 133.5 eV. Thereafter, ($I_{P-F}/I_{P-O}$ was calculated from the peak intensity ($I_{P-O}$) of the P—O bond and the peak intensity ($I_{P-F}$) of the P—F bond.

(Cycle Characteristics Test)

The charge/discharge test of 100 cycles was carried out at 60° C. at a 1C rate and a voltage range of 2.7V to 1.5 V. As a result, the capacity retention rate after 100 cycles was 97.2%. The results are shown in Table 1.

Example 2

The nonaqueous electrolyte battery of Example 2 was produced in the same manner as in Example 1 except that $LiPO_2F_2$ 2 mass % was added as an additive to the nonaqueous electrolyte.

For the nonaqueous electrolyte battery of Example 2, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.65.

The nonaqueous electrolyte battery of Example 2 was subjected to the charge/discharge test in the same manner as in Example 1. As a result, the capacity retention rate after 100 cycles was 97.0%.

The above results are shown in Table 1.

Example 3

The nonaqueous electrolyte battery of Example 3 was produced in the same manner as in Example 1 except that the solution, which was prepared by dissolving $LiPF_6$ (2 mol/L) in the mixed solvent prepared by mixing propylene carbonate (PC) and diethyl carbonate (DEC) in a volume ratio of 1:2, was used as the nonaqueous electrolyte.

For the nonaqueous electrolyte battery of Example 3, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.50.

The nonaqueous electrolyte battery of Example 3 was subjected to the charge/discharge test in the same manner as in Example 1. As a result, the capacity retention rate after 100 cycles was 96.4%.

The above results are shown in Table 1.

Example 4

The nonaqueous electrolyte battery of Example 4 was produced in the same manner as in Example 1 except that $TiO_2$ (B) was used as the negative electrode active material.

For the nonaqueous electrolyte battery of Example 4, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.68.

The nonaqueous electrolyte battery of Example 4 was subjected to the charge/discharge test in the same manner as in Example 1. As a result, the capacity retention rate after 100 cycles was 96.1%.

The above results are shown in Table 1.

Example 5

The nonaqueous electrolyte battery of Example 5 was produced in the same manner as in Example 1 except that $TiNb_2O_7$ was used as the negative electrode active material.

For the nonaqueous electrolyte battery of Example 5, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.47.

The nonaqueous electrolyte battery of Example 5 was subjected to the charge/discharge test in the same manner as in Example 1. As a result, the capacity retention rate after 100 cycles was 91.5%.

The above results are shown in Table 1.

Example 6

The nonaqueous electrolyte battery of Example 6 was produced in the same manner as in Example 1 except that $Li_2Na_{1.5}Ti_{5.5}Nb_{0.5}O_{14}$ was used as the negative electrode active material.

For the nonaqueous electrolyte battery of Example 6, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.50.

The nonaqueous electrolyte battery of Example 6 was subjected to the charge/discharge test in the same manner as in Example 1. As a result, the capacity retention rate after 100 cycles was 92.1%.

The above results are shown in Table 1.

Example 7

The nonaqueous electrolyte battery of Example 7 was produced in the same manner as in Example 1 except that $LiMn_{0.8}Fe_{0.15}Ca_{0.05}PO_4$ was used as the negative electrode active material.

For the nonaqueous electrolyte battery of Example 7, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.58.

The nonaqueous electrolyte battery of Example 7 was subjected to the charge/discharge test in the same manner as in Example 1. As a result, the capacity retention rate after 100 cycles was 96.4%.

The above results are shown in Table 1.

Example 8

The nonaqueous electrolyte battery of Example 8 was produced in the same manner as in Example 1 except that the solution, which was prepared by dissolving $LiPF_6$ (1.2 mol/L) in the mixed solvent prepared by mixing propylene carbonate (PC) and diethyl carbonate (DEC) in a volume ratio of 1:2, was used as the nonaqueous electrolyte.

For the nonaqueous electrolyte battery of Example 8, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.42.

The nonaqueous electrolyte battery of Example 8 was subjected to the charge/discharge test in the same manner as in Example 1. As a result, the capacity retention rate after 100 cycles was 93.5%.

The above results are shown in Table 1.

Comparative Example 1

The nonaqueous electrolyte battery of Comparative Example 1 was produced in the same manner as in Example 1 except that the solution, which was prepared by dissolving $LiPF_6$ (1.2 mol/L) in the mixed solvent prepared by mixing propylene carbonate (PC) and diethyl carbonate (DEC) in a volume ratio of 1:2, was used as the nonaqueous electrolyte and that the heat treatment was not carried out.

For the nonaqueous electrolyte battery of Comparative Example 1, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.31.

The nonaqueous electrolyte battery of Comparative Example 1 was subjected to the charge/discharge test in the same manner as in Example 1. As a result, the capacity retention rate after 100 cycles was 91.0%.

The above results are shown in Table 2.

Comparative Example 2

The nonaqueous electrolyte battery of Comparative Example 2 was produced in the same manner as in Example 5 except that the solution, which was prepared by dissolving $LiPF_6$ (1.2 moL/L) in the mixed solvent prepared by mixing propylene carbonate (PC) and diethyl carbonate (DEC) in a volume ratio of 1:2, was used as the nonaqueous electrolyte and that the heat treatment was not carried out.

For the nonaqueous electrolyte battery of Comparative Example 2, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.34.

The nonaqueous electrolyte battery of Comparative Example 2 was subjected to the charge/discharge test in the same manner as in Example 1. As a result, the capacity retention rate after 100 cycles was 82.6%.

The above results are shown in Table 2.

Comparative Example 3

The nonaqueous electrolyte battery of Comparative Example 3 was produced in the same manner as in Example 6 except that the solution, which was prepared by dissolving $LiPF_6$ (1.2 mol/L) in the mixed solvent prepared by mixing propylene carbonate (PC) and diethyl carbonate (DEC) in a volume ratio of 1:2, was used as the nonaqueous electrolyte and that the heat treatment was not carried out.

For the nonaqueous electrolyte battery of Comparative Example 3, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.25.

The nonaqueous electrolyte battery of Comparative Example 3 was subjected to the charge/discharge test in the same manner as in Example 1. As a result, the capacity retention rate after 100 cycles was 88.5%.

The above results are shown in Table 2.

Comparative Example 4

The nonaqueous electrolyte battery of Comparative Example 4 was produced in the same manner as in Example 7 except that the solution, which was prepared by dissolving $LiPF_6$ (1.2 mol/L) in the mixed solvent prepared by mixing propylene carbonate (PC) and diethyl carbonate (DEC) in a volume ratio of 1:2, was used as the nonaqueous electrolyte and that the heat treatment was not carried out.

For the nonaqueous electrolyte battery of Comparative Example 4, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.29.

The nonaqueous electrolyte battery of Comparative Example 4 was subjected to the charge/discharge test in the same manner as in Example 1. As a result, the capacity retention rate after 100 cycles was 84.3%.

The above results are shown in Table 2.

Comparative Example 5

The nonaqueous electrolyte battery of Comparative Example 5 was produced in the same manner as in Example 8 except that the solution, which was prepared by dissolving $LiPF_6$ (1.2 mol/L) in the mixed solvent prepared by mixing propylene carbonate (PC) and diethyl carbonate (DEC) in a volume ratio of 1:2, was used as the nonaqueous electrolyte and that the heat treatment was not carried out.

For the nonaqueous electrolyte battery of Comparative Example 5, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.29.

The nonaqueous electrolyte battery of Comparative Example 5 was subjected to the charge/discharge test in the same manner as in Example 1. As a result, the capacity retention rate after 100 cycles was 89.7%.

The above results are shown in Table 2.

Comparative Example 6

The nonaqueous electrolyte battery of Comparative Example 6 was produced in the same manner as in Example 1 except that the solution, which was prepared by dissolving LiPF$_6$ (4.5 mol/L) in the mixed solvent prepared by mixing propylene carbonate (PC) and diethyl carbonate (DEC) in a volume ratio of 1:2, was used as the nonaqueous electrolyte and that the heat treatment was carried out at 100° C. for 96 hours.

For the nonaqueous electrolyte battery of Comparative Example 6, XPS was carried out in the same manner as in Example 1. As a result, the ratio ($I_{P-F}/I_{P-O}$) of the peak intensity ($I_{P-F}$) of the P—F bond to the peak intensity ($I_{P-O}$) of the P—O bond on the surface of the positive electrode was 0.85.

The nonaqueous electrolyte battery of Comparative Example 6 was subjected to the charge/discharge test in the same manner as in Example 1. As a result, the capacity retention rate after 100 cycles was 81.5%.

The above results are shown in Table 2.

The results in Table 1 show that the nonaqueous electrolyte batteries of Examples 1 to 8 had the positive electrode in which the ratios ($I_{P-F}/I_{P-O}$) of the peak intensity ($I_{P-F}$) of the P—F bond to the peak intensity ($I_{P-O}$) of the P—O bond on the surface of the positive electrode, which were measured by X-ray photoelectron spectroscopic analysis, were 0.4 or more and 0.8 or less, and therefore, the capacity retention rates after 100 cycles at 60° C. were 91.5% or more.

The results in Table 2 show that the nonaqueous electrolyte batteries of Comparative Examples 1 to 6 had the positive electrode in which the ratios ($I_{P-F}/I_{P-O}$) of the peak intensity ($I_{P-F}$) of the P—F bond to the peak intensity ($I_{P-O}$) of the P—O bond on the surface of the positive electrode, which were measured by X-ray photoelectron spectroscopic analysis, were less than 0.4 or more than 0.8, and therefore, the capacity retention rates after 100 cycles of 60° C. were 91.0/or less.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

TABLE 1

| Example | Positive Electrode | Negative Electrode | Electrolyte | $I_{P-F}/I_{P-O}$ | Heat Treatment | Capacity Retention Rate after 100 Cycles at 60° C. (%) |
|---|---|---|---|---|---|---|
| 1 | LiMn$_{0.8}$Fe$_{0.15}$Mg$_{0.05}$PO$_4$ | Li$_4$Ti$_5$O$_{12}$ | 3.0 mol/L LiPF$_6$ PC:DEC = 1:2 | 0.60 | 80° C., 48 h | 97.2 |
| 2 | LiMn$_{0.8}$Fe$_{0.15}$Mg$_{0.05}$PO$_4$ | Li$_4$Ti$_5$O$_{12}$ | 3.0 mol/L LiPF$_6$ PC:DEC = 1:2 (LiPO$_2$F$_2$ 2 wt %) | 0.65 | 80° C., 48 h | 97.8 |
| 3 | LiMn$_{0.8}$Fe$_{0.15}$Mg$_{0.05}$PO$_4$ | Li$_4$Ti$_5$O$_{12}$ | 3.0 mol/L LiPF$_6$ PC:DEC = 1:2 | 0.50 | 80° C., 48 h | 96.4 |
| 4 | LiMn$_{0.8}$Fe$_{0.15}$Mg$_{0.05}$PO$_4$ | TiO$_2$(B) | 3.0 mol/L LiPF$_6$ PC:DEC = 1:2 | 0.68 | 80° C., 48 h | 96.1 |
| 5 | LiMn$_{0.8}$Fe$_{0.15}$Mg$_{0.05}$PO$_4$ | TiNb$_2$O$_7$ | 3.0 mol/L LiPF$_6$ PC:DEC = 1:2 | 0.47 | 80° C., 48 h | 91.5 |
| 6 | LiMn$_{0.8}$Fe$_{0.15}$Mg$_{0.05}$PO$_4$ | Li$_2$Na$_{1.5}$Ti$_{5.5}$Nb$_{0.5}$O$_{14}$ | 3.0 mol/L LiPF$_6$ PC:DEC = 1:2 | 0.50 | 80° C., 48 h | 92.1 |
| 7 | LiMn$_{0.8}$Fe$_{0.15}$Mg$_{0.05}$PO$_4$ | Li$_4$Ti$_5$O$_{12}$ | 3.0 mol/L LiPF$_6$ PC:DEC = 1:2 | 0.58 | 80° C., 48 h | 96.4 |
| 8 | LiMn$_{0.8}$Fe$_{0.15}$Mg$_{0.05}$PO$_4$ | Li$_4$Ti$_5$O$_{12}$ | 1.2 mol/L LiPF$_6$ PC:DEC = 1:2 | 0.42 | 80° C., 48 h | 93.5 |

TABLE 2

| Comparative Example | Positive Electrode | Negative Electrode | Electrolyte | $I_{P-F}/I_{P-O}$ | Heat Treatment | Capacity Retention Rate after 100 Cycles at 60° C. (%) |
|---|---|---|---|---|---|---|
| 1 | LiMn$_{0.8}$Fe$_{0.15}$Mg$_{0.05}$PO$_4$ | Li$_4$Ti$_5$O$_{12}$ | 1.2 mol/L LiPF$_6$ PC:DEC = 1:2 | 0.31 | None | 91.0 |
| 2 | LiMn$_{0.8}$Fe$_{0.15}$Mg$_{0.05}$PO$_4$ | TiO$_2$(B) | 1.2 mol/L LiPF$_6$ PC:DEC = 1:2 | 0.34 | None | 82.6 |
| 3 | LiMn$_{0.8}$Fe$_{0.15}$Mg$_{0.05}$PO$_4$ | TiNb$_2$O$_7$ | 1.2 mol/L LiPF$_6$ PC:DEC = 1:2 | 0.25 | None | 88.5 |
| 4 | LiMn$_{0.8}$Fe$_{0.15}$Mg$_{0.05}$PO$_4$ | Li$_2$Na$_{1.5}$Ti$_{5.5}$Nb$_{0.5}$O$_{14}$ | 1.2 mol/L LiPF$_6$ PC:DEC = 1:2 | 0.29 | None | 84.3 |
| 5 | LiMn$_{0.8}$Fe$_{0.15}$Mg$_{0.05}$PO$_4$ | Li$_4$Ti$_5$O$_{12}$ | 1.2 mol/L LiPF$_6$ PC:DEC = 1:2 | 0.29 | None | 89.7 |
| 6 | LiMn$_{0.8}$Fe$_{0.15}$Mg$_{0.05}$PO$_4$ | Li$_4$Ti$_5$O$_{12}$ | 4.5 mol/L LiPF$_6$ PC:DEC = 1:2 | 0.85 | 100° C., 96 h | 81.5 |

The invention claimed is:

1. A nonaqueous electrolyte battery comprising:
a positive electrode containing a positive electrode active material made of a compound represented by a compositional formula of $LiMn_{1-x-y}Fe_xA_yPO_4$ wherein
A is at least one selected from the group consisting of Mg, Ca, Al, Ti, Zn and Zr, $0 \leq x \leq 0.3$, and $0 \leq y \leq 0.1$,
a surface of the positive electrode active material is at least partially coated with a carbonaceous material, and
the surface of the positive electrode active material is further coated with a material containing P—F bonds obtained by reaction of the positive electrode active material with an electrolyte salt;
a negative electrode containing a negative electrode active material made from a titanium composite oxide; and
a nonaqueous electrolyte comprising an organic solvent and a lithium salt selected from the group consisting of lithium hexafluorophosphate ($LiPF_6$), lithium tetrafluoroborate ($LiBF_4$) and lithium hexafluoroarsenate ($LiAsF_6$), wherein
a ratio ($I_{P-F}/I_{P-O}$) of a peak intensity ($I_{P-F}$) of a P—F bond to a peak intensity ($I_{P-O}$) of a P—O bond on the surface of the positive electrode, which are measured by X-ray photoelectron spectroscopic analysis, is 0.4 or more and 0.8 or less.

2. The nonaqueous electrolyte battery according to claim 1, wherein the titanium composite oxide comprises at least one selected from the group consisting of a spinel type lithium titanate $Li_4Ti_5O_{12}$, a monoclinic β type titanium composite oxide $TiO_2$, and $Ti_{1-x}M1_xNb_{2-y}M2_yO_{7-\delta}$ wherein M1 and M2 are at least one selected from the group consisting of Mg, Fe, Ni, Co, W, Ta and Mo, M1 and M2 may be the same or different, $0 \leq x \leq 1$, and $0 \leq y \leq 1$, and
$Li_2Na_{2-x}M1_xTi_6O_{14}$ wherein M1 is at least one selected from the group consisting of Nb, W, Ta and Mo, and $0 \leq x \leq 1$.

3. A battery pack comprising at least one of the nonaqueous electrolyte battery according to claim 1.

4. The battery pack according to claim 3, further comprising an external terminal for energization and a protective circuit.

5. The battery pack according to claim 3 comprising a plurality of the nonaqueous electrolyte batteries, wherein the nonaqueous electrolyte batteries are connected in series, in parallel or with a combination of series connection and parallel connection.

6. The nonaqueous electrolyte battery according to claim 1, wherein the organic solvent is selected from the group consisting of cyclic carbonates, chain carbonates, cyclic ethers, chain ethers, γ-butyrolactone (GBL); α-methyl-γ-butyrolactone (MBL);
acetonitrile (AN), and sulfolane (SL).

7. The nonaqueous electrolyte battery according to claim 1, wherein the organic solvent is a mixture comprising two or more selected from the group consisting of propylene carbonate (PC), ethylene carbonate (EC), diethyl carbonate (DEC), dimethyl carbonate (DMC) methyl ethyl carbonate (MEC), and γ-butyrolactone ((IBL).

8. A vehicle equipped with the battery pack according to claim 3.

9. The vehicle according to claim 8, wherein the battery pack recovers a regenerative energy of a power of the vehicle.

* * * * *